Figure 1:
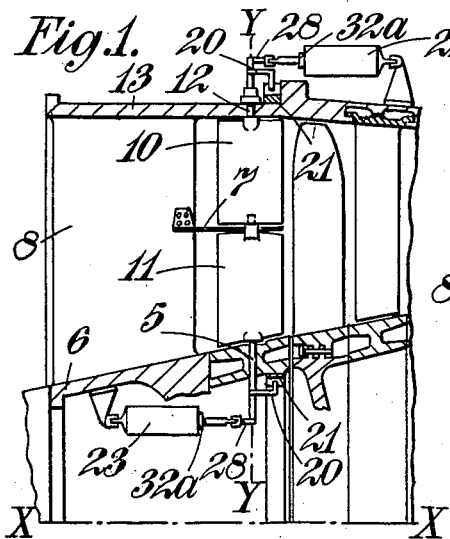

INVENTORS:
G. L. WILDE
A. B. McKENZIE
by Wilkinson Mawhinney
ATTYS.

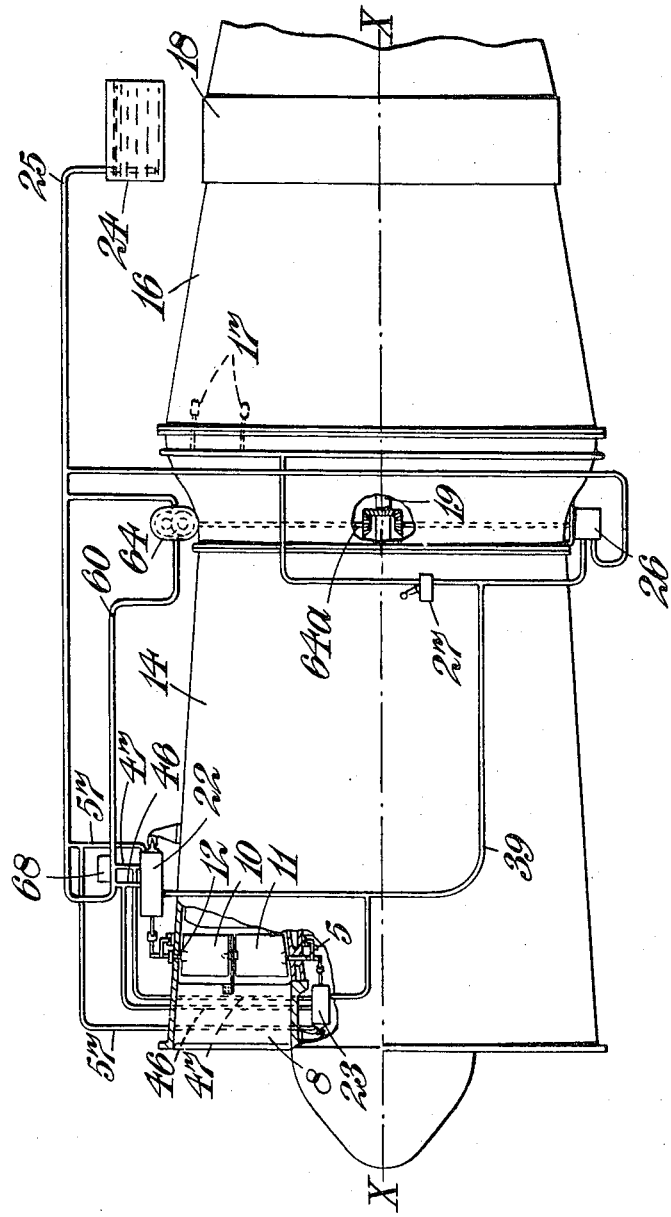

United States Patent Office 2,728,518
Patented Dec. 27, 1955

2,728,518

METHOD AND MEANS FOR REGULATING CHARACTERISTICS OF MULTI-STAGE AXIAL-FLOW COMPRESSORS

Geoffrey Light Wilde, Coxbench, and Archibald Bathgate McKenzie, Mickleover, England, assignors to Rolls-Royce Limited, Derby, England, a British company Application February 21, 1951, Serial No. 212,016

13 Claims. (Cl. 230—115)

This invention relates to multi-stage axial flow compressors, and has for its object to provide a method of and means for regulating characteristics of the compressor in a desirable manner over a wide range of operating conditions.

The invention has special importance in relation to multi-stage axial flow compressors of the high compression ratio kind, such as are, for example, used in gas-turbine engines for aircraft, where it is desired to design the compressor to operate at high efficiency, particularly in the upper portion of the rotational speed range, corresponding to medium or cruise power and maximum power conditions.

It is usual to design such a compressor to obtain efficient operation in such a particular speed range, and such design involves matching of the blade characteristics, including incidence and profile, to maintain an aerodynamically desirable flow condition in the compressor at such speed condition.

In this specification the term "rotational speed condition" includes either the actual rotational speed of the compressor, the corrected rotational speed, or an operating variable uniquely related to such actual rotational speed or corrected rotational speed. The "corrected rotational speed," a term well known in the art, represents the actual rotational speed corrected for intake gas temperature. If the actual rotational speed is represented by $N_a$ and the intake gas temperature is represented by $T_1$ (° K.), the corrected speed $N_c$ is given by:

$$N_c = N_a \sqrt{\frac{288}{T_1}}$$

The design of the compressor may, for example, be such as to maintain a constant mean axial velocity of the working medium from inlet to outlet of the compressor at a particular rotational speed, and, in order to give such conditions, the shape of the compressor duct, i. e. the annular passage from inlet to outlet of the compressor, and the incidence and profile of the blading are chosen appropriately. This results in the compressor duct or walls converging as from inlet to outlet.

It has been found that, in order to obtain a high mass flow without excessive overall diameter, a low value of the hub/tip ratio of the blade in the inlet stages is required. The term hub/tip ratio is defined as:

$$\frac{\text{Rotor diameter at root of blading}}{\text{Rotor diameter at tip of blading}}$$

Although the present invention has general application to multi-stage axial flow compressors of the high compression ratio kind, it is of particular value where the hub/tip ratio is less than 0.55:1.0 at the inlet stage.

Where the compressor is designed to be aerodynamically efficient at a particular rotational speed in the higher range, it is found that, at speeds in the lower range of rotational speed, the stages of the compressor towards the inlet end thereof tend to stall aerodynamically, due to reduced overall density ratio of gas passing through the compressor and stages in which such stalling is liable to occur are herein referred to as "inlet stages."

A stage comprises a row of rotor blades and the succeeding row of stator blades; the wording "associated with an inlet stage" is intended to include the row of stator blades immediately preceding the row of rotor blades of the inlet stage, as for example the inlet guide vanes which precede the first stage rotor blade row.

The incidence of a rotor blade is defined as the difference between the angle which the tangent to the camber line of the blade at the nose point of the blade makes to the axial direction and the angle which the relative gas stream makes to the axial direction. The nose point of the blade is taken as the centre of the nose radius if the nose is radiused.

Swirl is defined as the circumferential component of velocity of the gases relative to the stationary structure.

The present invention provides a method of and means for improving the characteristics of multi-stage axial flow compressors in which inefficient operation of inlet stages of the compressor is liable to be experienced during operation at speeds in the lower speed range. Thus the invention seeks primarily to provide a multi-stage axial flow compressor which is aerodynamically efficient over a wide range of speed conditions.

According to this invention a multi-stage axial-flow compressor comprises in combination a row of stator blades associated with an inlet stage and means for varying the direction of the flow of gases through said row of blades to decrease the incidence of the rotor blades of the following stage with respect to said gases over the inner portion of said rotor blades, and to increase the incidence of said rotor blades with respect to said gases over the outer portion of said rotor blades, on decrease of the rotational speed of the compressor, and vice versa on increase of the rotational speed.

According to a feature of the invention, each blade of said row of stator blades has an outer part including a major chordal portion at the outer end of the blade and an inner part including a major chordal portion at the inner end of the blade, both said parts being simultaneously adjustable to vary the swirl of the gases at the outlet of said row of blades and thereby to vary the incidence of the rotor blades of the following stage, and adjusting means to adjust said parts in the sense of increasing the swirl at the outlet from said inner part and thereby decreasing the incidence of the inner part of the rotor blades, and of decreasing the swirl at the outlet from said outer part and thereby increasing the incidence of the outer part of the rotor blades, on decrease of rotational speed of the compressor, and vice versa on increase of the rotational speed.

A feature of the invention provides that the compressor may further comprise speed-sensitive control means arranged to be sensitive to a rotational speed condition of said compressor and arranged to control said adjusting means to adjust said outer part so that the swirl at outlet therefrom is decreased and simultaneously to adjust said inner part so that the swirl at outlet therefrom is increased when said compressor rotational speed passes through a selected value in deceleration and vice versa in acceleration. Such speed-sensitive control means may cause progressive adjustment of the swirl at outlet from said inner and outer parts of said blades on progressive change of the rotational speed of the compressor in a selected speed range, and may be sensitive to the actual rotational speed of the compressor to the corrected rotational speed of the compressor, or to an operating variable uniquely related to the actual rotational speed or the corrected rotational speed of the compressor.

According to another feature of the invention, at least one of the adjustable blades may be deformable in torsion and have its inner and outer parts twisted in opposite directions by the adjusting means.

In other constructions at least one of said blades has its outer part separate from its inner part, and has said parts rotated in opposite directions by said adjusting means. In such blades, the adjacent edges of said inner and outer parts of said one blade may extend chordwise of the blade or they may extend diagonally across the blade.

In another aspect, the invention provides a method of operating a multi-stage axial flow compressor which has at least one row of stator blading associated with an inlet stage comprising blades each of which has an outer part including a major chordal portion at the outer end of the blade and an inner part including a major chordal portion at the inner end of the blade, each of said parts being adjustable to adjust the swirl of the gas flow at outlet from said row of stator blading, which method comprises adjusting the outer part so that the swirl at outlet therefrom is decreased and simultaneously adjusting said inner part so that the swirl at outlet therefrom is increased when the rotational speed of said compressor passes through a selected value in deceleration and vice versa in acceleration. Preferably the incidence of said outer part is progressively increased and the incidence of said inner part is progressively reduced on progressive change of the rotational speed of said compressor in a selected range of values in deceleration and vice versa in acceleration.

Adoption of the invention enables the flow conditions in the inlet stages of the axial flow compressor at rotational speeds below the designed speed to be matched more correctly with the flow conditions in the later stages thereof, by ensuring that the axial velocity at the root of the blading is reduced, due to increased swirl, whilst the axial velocity at the tip is increased due to decreased swirl. These flow conditions are desirable in relation to the succeeding rotor blading to maintain the unstalled conditions of such blading, and ensure the maintenance of the work done by the stage as uniform as possible along the span of the blading from root to tip.

The invention has particular application in its use on multi-stage axial flow compressors having a compression ratio greater than 6:1, a hub/tip ratio at inlet of less than .55:1, and a desired overall speed range of greater than 3:1.

Such a compressor may for example comprise 10 stages of axial flow blading, having a row of stator blading preceding the rotor blading of the first stage. This row of stator blading is commonly referred to as "inlet guide vanes" and the invention may be applied to such inlet guide vanes, either solely or in addition to its application to other stator blading in the inlet stages of the compressor.

Figure 2:
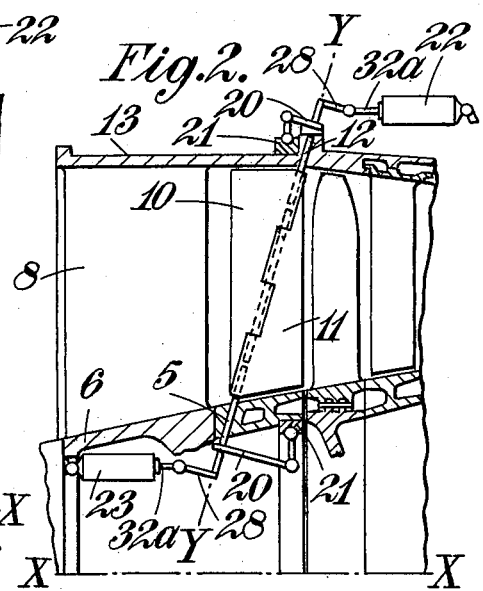
Figure 3:
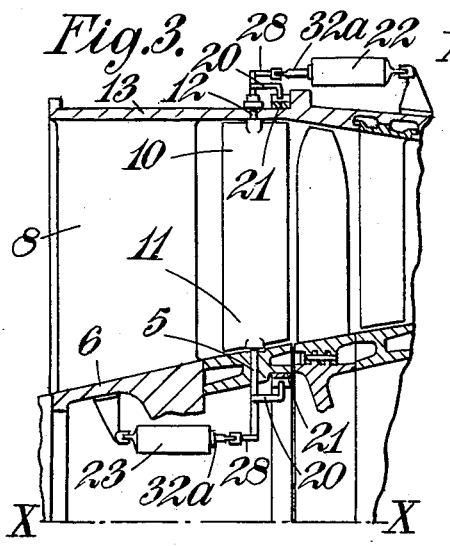
Figure 5:
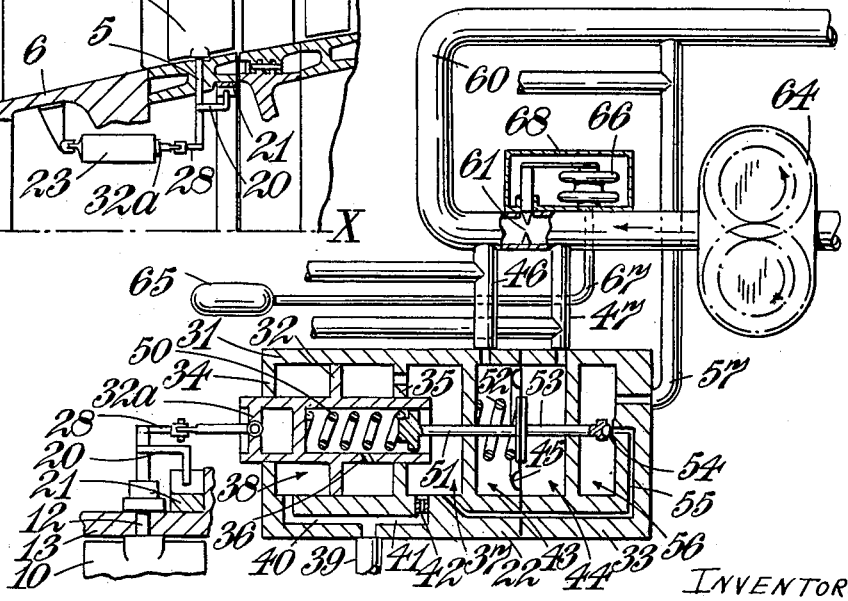

In the accompanying drawings:

Figures 1, 2 and 3 show various kinds of blades suitable for use in the invention, Figure 4 shows a gas-turbine engine, with parts broken away, which employs the invention, and Figure 5 shows, partly in section, control means employed on the engine shown in Figure 4.

Referring to Figures 1–3, the inlet guide vane blading of a multi-stage axial-flow compressor comprises a circumferential assembly of blades of aerodynamically desirable profile, each of the blades being formed in two parts, 10, 11, the part 10 being mounted in suitable bearing means 12 in the outer casing 13 of the compressor for rotation about an axis substantially spanwise of the blade, and the other part 11 being similarly mounted in suitable bearings 5 in a ring secured to the stationary bearing support structure 6 for the front bearing of the compressor.

The outer blade portions 10 mounted in the compressor casing 13 are interconnected to be adjustable about the spanwise axis Y—Y in unison, as are also the inner blade portions 11 mounted in compressor structure 6 at inner radius. For example a convenient mechanical arrangement provides a lever arm 20 on each blade portion, the lever arm 20 being interconnected by a ring 21 which is angularly movable about the axis of the compressor, thus to turn the blade portions and thereby adjust the swirl imposed on air passing therethrough.

Suitable power motors 22, 23 are associated with the outer set and the inner set of blade portions respectively to effect their individual adjustment, the arrangement being such that under running conditions in the lower rotational speed range of the compressor the outer portions of the stator blading are adjusted to reduce the swirl at outlet from the inlet guide vanes and the inner portions are simultaneously adjusted to increase the swirl.

The two portions of the stator blading may be constituted by splitting the blade chordwise, as shown in Figure 1, so as to provide a tip part 10 at the outer radius and a root part 11 lying at the inner radius in the compressor annulus. In this construction, both parts 10, 11 are also mounted in bearings carried by a ring 7 which extends axially of the axis of rotation X—X of the compressor and is secured to the radially extending spokes 8 which support the stationary bearing structure 6. Thus it will be appreciated that both the parts 10, 11 are supported for angular adjustment to alter their incidence to the air flow through the compressor about an axis Y—Y which extends spanwise of the blade.

In another arrangement illustrated in Figure 2, each blade of the blading which is adjustable is split diagonally, there being an outer part 10 having a major chordal portion at the outer end of the blade and providing the leading edge of the blading, whilst the inner part 11 providing the trailing edge portion of the blade has a major chordal portion at inner radius. The two parts 10, 11 are adjustable about the axis Y—Y, the outer part being adjusted by the power motor 22 and the inner part by the power motor 23. Such an arrangement approximates to a blade which is torsionally deformable about a spanwise axis.

In certain cases a torsionally deformable blade may be used, as illustrated in Figure 3, provision being made for the simultaneous adjustment of the tip and the root of the blade in opposite senses by the power motors 22, 23 respectively. In this case the two parts 10, 11 of each blade will not be physically separate.

The power supply to the motors is controlled by means of a speed-condition-sensitive device, for example, a centrifugal governor driven at a speed proportional to the rotational speed of the compressor, or a device sensitive to compression ratio, to actuate by electrical contacts the current supply to electric motors, when a predetermined rotational speed or compression ratio is reached in acceleration of the engine.

In other constructions hydraulic motors may be used. In certain cases it may be desirable to provide for the progressive adjustment of either or both portions of the stator blading over a range of rotational speed and to this end an arrangement may be used involving a hydraulic speed signal circuit and arranged to control a hydraulic servo supply to a follow-up motor device. Such a system is shown in Figures 4 and 5.

In Figures 4 and 5 the multi-stage axial-flow compressor 14 of a gas-turbine engine compresses air and discharges it into combustion equipment 16 where it is burnt with fuel injected through the injectors 17. The products of combustion pass from the combustion equipment 16 through a turbine 18 which is connected to drive the compressor 14 through the shaft 19.

Fuel is supplied to the burners 17 from a tank 24 through a suction pipe 25 of a fuel pump 26 the delivery of which is connected to the manifold of the burners 17 through a throttle 27. The pump 26 is driven from the engine through take-off shaft 29.

The parts 10, 11 of the adjustable intake guide vanes are interlinked for simultaneous operation in opposite senses by hydraulic ram devices 22, 23, the stems 32a of the ram pistons 32 being connected to radius arms 28 one on each part of the adjustable guide vanes. The ram devices 22, 23 each comprise (Figure 5) a cylinder 31 in which the piston 32 reciprocates, and a control mechanism 33 whereby the position of piston 32 in cylinder 31 is determined in accordance with the corrected engine rotational speed. The stem 32a is hollow and works in guides 34, 35 which also act as limit stops for the piston 32. The interior of stem 32a communicates through bore 36 with the space 37 to one side of piston 32 so that the effective area of the piston exposed to the space 37 is greater than that exposed to cylinder space 38. Pressure fluid is conveyed from the discharge of the fuel pump 26 to cylinder 31 through a pipe 39 to the ram devices 22, 23, the pipe connecting with bores 40, 41 in each of the respective ram devices. The bore 40 communicates directly with space 38, while the bore 41 is in communication with space 37 through restrictor 42.

The control mechanism 33 comprises two compartments 43, 44, separated by a flexible diaphragm 45, whereof the compartment 43 is connected by pipe 46 to a pipe 60 downstream of a variable-area flow-restricting orifice 61 and compartment 44 is connected by pipe 47 to upstream of the restrictor 61. The pipe 60 is connected as a loop to pipe 25 and has located in it a fixed-capacity positive-displacement pump 64 which is driven through take-off 64a (Figure 4) from shaft 19 so that the flow through orifice 61 is a function of the engine rotational speed. The area of the orifice 61 is adjusted in accordance with the temperature of the bulb 65 which is situated in the intake of the compressor by the bellows 66 which is connected to the bulb by the pipe 67, the bellows 66 being contained within a casing 68.

Thus the flow through the pump is proportional to actual engine rotational speed, while the area of the orifice 61 is dependent on the intake temperature. The flow and area are related so that the pressure drop across the orifice 61 is proportional to corrected engine rotational speed.

The diaphragm 45 is loaded by a spring 50 through rod 51, this load being dependent on the position of the piston 32 in cylinder 31, and by a secondary spring 52 which acts in the same direction as spring 50 and against the fluid pressure load.

The diaphragm movements are communicated to rod 53 carrying a half ball valve element 54 controlling the outflow of fluid from space 37 through a duct 55 leading from space 37 to a chamber 56 from which a pipe 57 leads to the suction side of pump 26.

When no pressure is acting in the system the piston 32 will be at the left-hand end of cylinder 31 (as seen in Figure 5) and the spring 50 will be virtually uncompressed. It will be clear that when the fluid pressure acting on diaphragm 45 increases to a sufficient value to overcome spring 52, the half ball valve will lift allowing fluid to bleed from space 37, the pressure within which therefore falls and the piston 32 moves to the right until the load due to spring 50 overcomes the fluid pressure load on diaphragm 45. Thus for each value of corrected engine rotational speed in the range of speeds the piston 32 will occupy a corresponding position in cylinder 31 and the part 10 or 11 of the inlet guide vanes which is connected to the piston will have a particular outlet angle, by which the swirl of the air over that spanwise portion of the blade will be determined.

The effective area of restrictor orifice 61, the area of diaphragm 45 and the strength of spring 52 are so selected in relation to the output of pump 64 that this control of the blade parts 10, 11 is effective in a range of rotational speeds, of which the lower limit is determined by the spring 52.

We claim:
1. A multi-stage axial-flow compressor comprising a stator casing, a rotor, a stage of blading at the inlet end of the compressor comprising a row of rotor blades mounted on said rotor and a row of stator blades mounted on said stator casing downstream of said rotor blades, a row of adjustable stator blades immediately upstream of said stage, each of said adjustable blades of said row having an outer part including a major chordal portion at the outer end of the blade and an inner part including a major chordal portion at the inner end of the blade, bearing means supporting the inner part and the outer part of each of said blades in said casing for independent rotation each about a spanwise-extending axis, and actuating means operative to rotate each of said inner parts in unison in one sense and simultaneously to rotate each of said outer parts in unison in the other sense.

2. A multi-stage axial-flow compressor as claimed in claim 1 wherein at least one of said adjustable stator blades is deformable in torsion and said actuating means comprises a first actuating member connected to the outer part of said blade and a second actuating member connected to the inner part of said blade and means to move said two actuating members simultaneously to twist said blade by rotating said two parts of said blade in opposite directions.

3. A multi-stage axial-flow compressor as claimed in claim 1 wherein at least one of said adjustable stator blades has separate outer and inner parts and said means comprises a first actuating member connected to said outer part and a second actuating member connected to said inner part and means to move said two actuating members simultaneously to rotate said two parts of said blade in opposite directions.

4. A multi-stage axial-flow compressor according to claim 3 wherein the adjacent edges of said inner and outer parts of said one blade extend chordwise of the blade.

5. A multi-stage axial-flow compressor according to claim 3 wherein the adjacent edges of said inner and outer parts of said one blade extend diagonally across the blade.

6. A multi-stage axial flow compressor comprising a stator casing, a rotor, a stage of blading at the inlet end of the compressor comprising a row of rotor blades mounted on said rotor and a row of stator blades mounted on said stator casing downstream of said rotor blades, a row of adjustable stator blades immediately upstream of said stage, each of said adjustable blades of said row having an outer part including a major chordal portion at the outer end of the blade and an inner part including a major chordal portion at the inner end of the blade, bearing means supporting the inner part and the outer part of each of said blades in said casing for independent rotation each about a spanwise-extending axis, actuating means operative to rotate each of said inner parts in unison in one sense and simultaneously to rotate each of said outer parts in unison in the other sense, and speed sensitive means sensitive to the rotational speed of said compressor and connected with said actuating means to cause each of said inner parts to rotate in a direction to increase the swirl of gases at the outlet therefrom and simultaneously to cause each of said outer parts to rotate in a direction to decrease the swirl of gases at the outlet therefrom when the rotational speed of said compressor decreases.

7. A multi-stage axial-flow compressor as claimed in claim 6 wherein said speed sensitive means is constituted by means to cause progressive and simultaneous adjustment of said inner and outer parts of said blades on progressive change of rotational speed of the compressor in a selected speed range.

8. A multi-stage axial-flow compressor as claimed in claim 6 wherein said speed sensitive means is of the kind which is sensitive to the actual rotational speed of the compressor.

9. A multi-stage axial-flow compressor as claimed in claim 6 wherein said speed sensitive means is of the kind which is sensitive to an operating variable uniquely related to the actual rotational speed of the compressor.

10. A multi-stage axial-flow compressor as claimed in claim 6 wherein said speed sensitive means is of the kind which is sensitive to the corrected rotational speed of said compressor.

11. A multi-stage axial-flow compressor as claimed in claim 6 wherein said speed sensitive means is sensitive to an operating variable which is uniquely related to the corrected rotational speed of the compressor.

12. A method of operating a multi-stage axial-flow compressor, which is designed to operate at high efficiency in the upper portion of the rotational speed range, in such a manner as to prevent stalling of the inlet stage thereof at speeds in the lower portion of the speed range which comprises decreasing the swirl of fluid entering the compressor adjacent the outer wall of the compressor duct and simultaneously increasing the swirl of fluid entering the compressor adjacent the inner wall of the compressor duct when the rotational speed passes through a selected value on deceleration; and increasing the swirl of fluid entering the compressor adjacent the outer wall of the compressor duct and simultaneously decreasing the swirl of fluid entering the compressor adjacent the inner wall of the compressor duct when the selected value of rotational speed is passed through on acceleration.

13. A method of operating a multi-stage axial-flow compressor, which is designed to operate at high efficiency in the upper portion of the rotational speed range, in such a manner as to prevent stalling of the inlet stage thereof at speeds in the lower portion of the speed range which comprises progressively decreasing the swirl of fluid entering the compressor adjacent the outer wall of the compressor duct and simultaneously progressively increasing the swirl of fluid entering the compressor adjacent the inner wall of the compressor duct while the compressor is decelerating in a selected range of rotational speeds; and progressively increasing the swirl of fluid entering the compressor adjacent the outer wall of the compressor duct and simultaneously progressively decreasing the swirl of fluid entering the compressor adjacent the inner wall of the compressor duct while the compressor is accelerating in said selected range of rotational speeds.

References Cited in the file of this patent

UNITED STATES PATENTS

| | | |
|---|---|---|
| 1,986,709 | Breguet | Jan. 1, 1935 |
| 2,374,342 | Gaubatz | Apr. 24, 1945 |
| 2,382,535 | Bauer | Aug. 14, 1945 |
| 2,455,251 | Hersey | Nov. 30, 1948 |
| 2,460,778 | Willgoos | Feb. 1, 1949 |
| 2,473,329 | Candler | June 14, 1949 |
| 2,477,954 | Blanc | Aug. 2, 1949 |
| 2,500,070 | Hagen | Mar. 7, 1950 |

FOREIGN PATENTS

| | | |
|---|---|---|
| 851,766 | France | Oct. 9, 1939 |
| 931,548 | France | Jan. 13, 1947 |